April 8, 1969  R. A. HOFFMAN ET AL  3,437,461
METHOD AND APPARATUS FOR BLENDING GASOLINES
Filed May 7, 1965
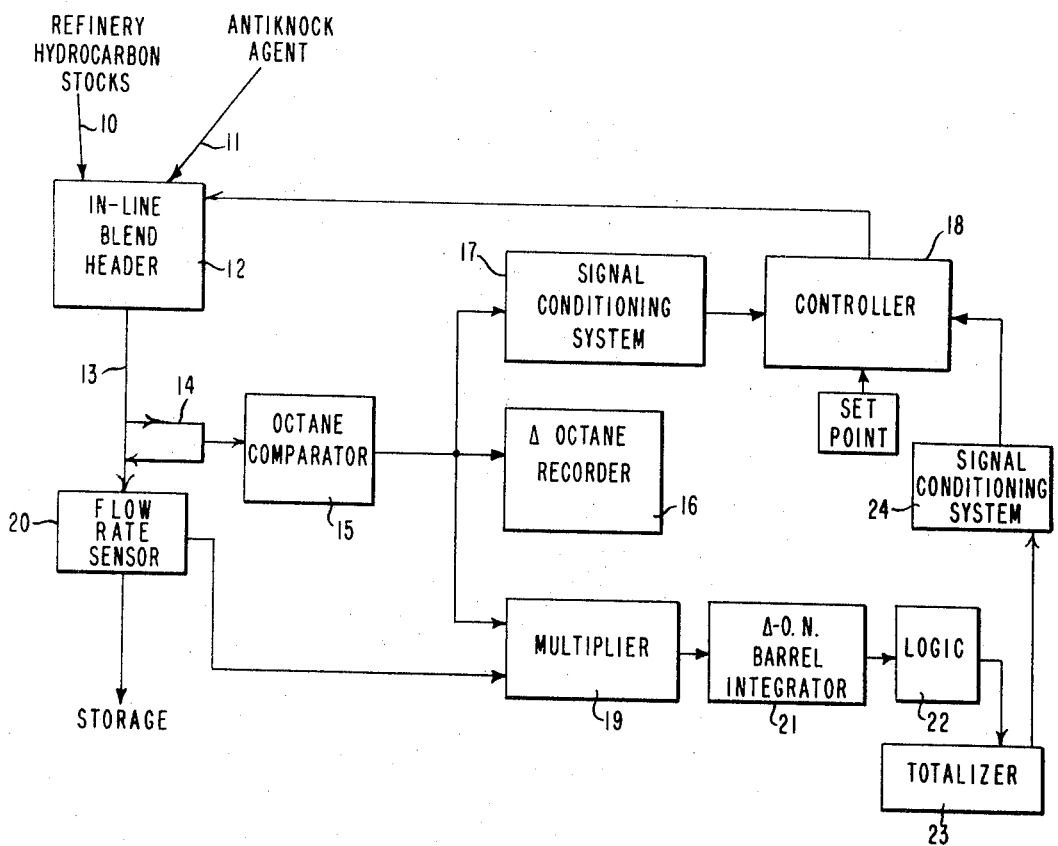
INVENTORS
RICHARD ALAN HOFFMAN
JOE TURNER MAY
FREDERICK WILLIAM MECKLEY
BY
ATTORNEY

United States Patent Office 3,437,461
Patented Apr. 8, 1969

3,437,461
METHOD AND APPARATUS FOR
BLENDING GASOLINES
Richard Alan Hoffman, Claymont, and Joe Turner
May and Frederick William Meckley, Wilmington,
Del., assignors to E. I. du Pont de Nemours and Company, Wilmington, Del., a corporation of Delaware
Filed May 7, 1965, Ser. No. 453,928
Int. Cl. G05d 11/00
U.S. Cl. 44—2                                            4 Claims

ABSTRACT OF THE DISCLOSURE

An apparatus and its use in the production of blended gasolines of specification octane quality and comprising a means for determining the difference in octane quality between two gasolines of known and unknown octane quality and producing a signal proportional to said difference, a means for determining the flow rate of the gasoline from the blender and producing a signal proportional to the flow rate, a means for multiplying the aforesaid signals and producing a signal which is a function of octane quality difference and flow rate, a means for integrating the signal from the multiplying means with respect to time and producing a signal which corresponds to an octane quality difference per volume unit, and a means for accumulating, in magnitude and direction, a sequence of signals from the integrator and producing a signal which represents a measurement of the octane quality difference, and the direction of the difference, between the blend and the specification.

---

This invention is directed to a novel system for monitoring and controlling the octane quality of refinery gasolines for spark-ignition engines.

The continuous in-line blending of gasoline components and additives, such as tetraethyl lead, to make finished gasolines at the refinery has become increasingly popular over the last few years because of the savings resulting from reduced inventories, reduced tankage, reduced octane giveaway, reduced laboratory testing, and reduced manpower. However, it has been recognized that savings in addition to those resulting from the in-line blending technique itself could be realized if a method could be achieved which would continuously and accurately measure the octane quality of the gasoline blends as the blends come from the in-line blender. Besides the additional savings the flexibility that such a method would impart to the in-line blending technique has also been appreciated by those skilled in the gasoline blending art.

The transportation of finished gasoline over huge distances by commercial pipe line has also become increasingly popular over the last few years. In commercial pipe line systems, where finished gasoline from several competitive refineries is combined and pumped simultaneously to their common destination, the piping company requires elaborate testing to guarantee the precise octane quality of gasoline in a specified storage tank before accepting the same for shipment.

Under present-day conditions, final octane quality of blended gasoline is measured by taking samples from the storage tanks and evaluating these samples by ASTM methods D-357-64, D-908-64 and D-1656-64. These ASTM methods involve the laborious procedure of evaluating each sample of blended gasoline at specified conditions and under rigid control as compared to two primary reference fuels of known octane quality or rating. The values obtained by the ASTM method are absolute octane number values. The results are often inaccurate and cannot be repeated with a high degree of confidence due to the drift of the engine between tests and the variation in rating characteristics from engine to engine. The procedure is time consuming and expensive, and often several tests are required before the determination is acceptable to the shipper. There exists, therefore, a need for a system or method which would continuously determine the octane quality of the blended gasoline with speed, accuracy, and a high degree of precision and assign an accurate final octane quality for all the gasoline produced during the blending run, which determination would be acceptable to the pipeline shipper without re-checking such determination by the ASTM methods.

It is, therefore, an object of this invention to provide a novel automatic method for continuously measuring and accumulating the total octane error produced during a blend of gasoline simultaneously with the production of the gasoline.

It is a further object of the present invention to provide an integrated system for automatically measuring and accumulating the total octane error of a blend of gasoline simultaneous with the production of the gasoline and automatically compensate for such error throughout the period of gasoline production so that the accumulated error at the end of the blending run is zero.

These and other objects will become apparent from the following description and claims.

The present invention is an integrated system which co-operates with the octane comparator described in co-pending application Ser. No. 410,129, filed Nov. 10, 1964, by Richard A. Hoffman, a co-inventor of this application.

More specifically, the present invention is directed to a novel method for continuously measuring and accumulating the total octane error of a blend of gasoline simultaneous with the production of the gasoline which comprises continuously producing a signal proportional to the octane error on an octane comparator while simultaneously producing a signal proportional to the rate of gasoline flowing from the blender, multiplying both measurements to obtain a signal representing the number of barrels produced per hour of octane quality differing from standard, integrating this signal with respect to time and accumulating the total number of barrels produced during blending which differs by a specified unit from specification and the direction of the difference.

The present invention is directed to a further embodiment which comprises feeding a signal corresponding to the accumulated total number of barrels in error produced into the controller regulating the addition of anti-knock agent or hydrocarbon component to the blender, wherein said controller can adjust conditions in the blending operation to dissipate this error throughout the blending run.

The octane comparator is an integrated unit which generates a signal continually throughout the blending run proportional to the difference in octane quality between a prototype fuel and the fuel running in the fuel line coming from the in-line blender. The prototype fuel, having been precisely prepared to a specified octane quality, represents the octane standard for the blending run. Broadly, the octane comparator determines the difference in octane quality between the prototype and line fuel by alternately running prototype and line fuels through a standard ASTM engine, which measures the difference in knock intensity between the two fuels. In order to have a frequent check on the performance of the engine, the alternating time cycle switching from one fuel to the other is as short as possible. A single carburetor is used for both fuels to eliminate the human error involved in setting two carburetors for maximum knock intensity.

The octane comparator can be used as a system for monitoring the octane error in the line fuel and making manual corrections of the in-line blending system to correct the error. Alternatively, the system can be modified to automatically adjust the in-line blending system to correct any error detected by the comparator.

However, in any blending system, a certain amount of off-standard gasoline is unavoidably produced, regardless of whether the system is on manual or automatic control. For example, for a time commencing with the upset of the blending system to the time when the octane comparator recognizes the upset and makes correction, it can be appreciated that a quantity of fuel has been blended which is different from specification and hence off-standard. Since the octane comparator always attempts to maintain instantaneous octane quality to specification, blending errors due to the time lag between sampling and correction will be cumulative and present at the end of the run. Therefore, even though the final octane value of the blend has been controlled more closely to the target octane value than the precision of the present ASTM method, there may remain a slight error in the final octane quality.

Although the slight upsets in the blending system which occur after the system has come to equilibrium might be tolerated, the off-standard fuel, particularly that made at start-up of the blending system, must be compensated for in some manner. To compensate for this error, it has recently been discovered that an integrated electrical system can be assembled which will determine the quantity of off-standard gasoline produced during a blending run and either enable an operator to assign a final octane number to the blend in view of the quantity of off-standard fuel made or, more preferable, co-operate with the comparator to make automatic adjustments in the blending system so that at the end of the run the entire blend will meet specification standards. This integrated system is called the delta octane barrel indicator.

A clearer understanding of the delta octane barrel indicator of this invention will be gained from the accompanying drawing which forms a part of this application.

The accompanying drawing is a block diagram of the delta octane barrel indicator. Referring to the drawing, various gasoline stocks 10 and a stream of anti-knock agent 11 are blended together in the in-line blend header 12. The blended stocks and anti-knock leave the in-line blend header 12 through line 13 and are transported to storage. At a point far enough from the blending operation to insure complete mixing of the gasoline stocks and anti-knock additive, a sample loop 14 transports line fuel to the octane compartor 15. The octane comparator generates a signal which is proportional to the difference in octane quality between the prototype fuel (the standard) and the fuel in the line coming from the blend header. This difference signal may be displayed visually on the strip chart recorder 16. If automatic control of octane quality is desired, the signal from the comparator 15 is sent to the signal conditioning system 17 which modifies the signal to make it compatible with the controller system 18. Thus, if the controller is digital, the analog signal from the comparator is converted by the signal conditioning system 17 to a digital signal for the controller. In addition to making the signal compatible with the controller, the signal conditioning system 17 can modify the signal intensity in whatever manner desired. The conditioned signal is fed into the controller 18 which responds to the signal by making any necessary changes in the blend header required to adjust fuel line octane quality to standard. This can be accomplished by varying any of the hydrocarbon components in an in-line blender or varying operating conditions of the refinery process unit.

The delta octane barrel indicator functions by taking the same signal from the octane comparator that is fed to the recorder 16 and feeding this signal into an electronic multiplier 19. The signal intensity from the comparator represents the degree of variance in octane number between line fuel and prototype fuel. Another signal is simultaneously fed into multiplier 19 which represents the flow rate of line fuel in the blend header. In the normal blending operation, the amount of fuel produced per hour is not constant. Various operational changes during blending affect to a considerable extent the flow rate of line fuel in the blend header. This signal representing the flow rate of fuel flowing in the blend header is generated by the flow rate sensor 20 located on line 13. The flow rate sensor 20 can be any of several devices known in the art for measuring the flow of liquids in a line. Examples of such devices are venturi, orifice plate, and turbine meter. The flow rate measurements are converted into electrical signals which represent the barrels of line fuel produced per hour. The multiplier takes the octane difference signal from the comparator and the line fuel flow rate signal from the flow rate sensor and multiplies the signals to produce a signal representing the number of barrels of off-standard fuel produced per hour. The multiplication of two signals can be easily accomplished by various types of commercial equipment well known in the art such as the Hull Device multiplier available from the F. W. Bell Company.

The multiplied signal, expressed in the number of barrels of off-specification fuel produced per hour, is integrated with respect to time in the integrator 21. It is usually desired to accumulate the error somewhere in the system to avoid using very precise and costly measuring equipment. Accordingly, the integrator is set to accumulate a finite octane-barrel error. An octane-barrel error is one barrel of fuel produced one octane number off-specification. For example, the comparator could give a signal that the line fuel differs from prototype by 0.01 octane number. After 100 barrels had been produced with this error, the integrator would have accumulated one octane-barrel error. Similarly, if line fuel differs from prototype by 10 octane numbers, one-tenth of a barrel would be an octane-barrel error.

To reduce the sensitivity of the system, the integrator can be conveniently set to accumulate octane-barrel error until ten or even one hundred octane-barrel errors have accumulated in the integrator. To accomplish this result, a logic system 22 can be connected to the integrator 21. The logic system accomplishes three objectives. First of all, the logic system senses when the set point on the integrator has been reached and causes it to discharge a unit of error, be it one octane-barrel error or a ten octane-barrel error. Secondly, the logic system senses the direction of the error, that is, whether the octane-barrel error is above or below specification. Finally, the logic circuit resets the integrator for it to accumulate the next unit of octane-barrel error. In accumulating the octane-barrel error, the integrator also appreciates the direction of error. For example, if the unit is set to discharge at 10 octane-barrel error and has accumulated 8 octane-barrel error above specification, when the blender starts to make fuel below specification, the integrator will dissipate the 8 octane-barrel error above specification before it will accumulate octane-barrel error below specification.

Once a unit of error has been discharged from the integrator, it is entered in the totalizer 23. The totalizer maintains a running count of the number of units of octane error and adds or subtracts such units from the total number, depending on the direction of error. Such totalizers are commercially available and well known in the art.

The data accumulated by the totalizer can be used directly, if desired, to assign a final octane number to the fuel produced during the blending run. For example, if the integrator is set to discharge a unit at each octane-barrel error, then the totalizer number represents the total number of barrels of fuel produced at one octane number above or below standard. From this information, the final octane number for a blending run can be easily ascertained by simple computations. If the counter establishes that 5000 barrels were produced one octane number below standard during a 50,000 barrel run, then a final octane number for the entire blend will be one-tenth of an octane number under specification.

The delta octane barrel indicator affords a unique method for manually controlling octane specification of a blending run. By constantly monitoring the contents on the totalizer, the operator in the blending control room can easily make manual adjustments in the in-line blender in order to keep the octane-barrel error as close as possible to zero. Thus, the octane-barrel error is the key information to the continuous manual control of the blending operation. Naturally, manual control will seldom allow the operator to complete the blending run with zero octane error. However, the error that does result can be considered in assigning a final octane number to the blend as heretofore described.

As a further embodiment of the present invention, the delta octane barrel indicator can be used effectively to cooperate in a fully automatic control of the in-line blender system so that the entire blend will correspond to specification at the finish of the run. This is accomplished by working out the octane-barrel error during the course of the blending run. This automatic method is especially successful in working out or compensating for the off-standard fuel made at start-up.

More specifically, the complete control to specification of the blending run is accomplished as follows. Referring again to the drawing, the magnitude of the accumulated error registered on the totalizer is converted into an electrical signal and sent to the controller 18, through another signal conditioning system 24. In a fashion similar to signal conditioning system 17, the signal from the totalizer is converted or modified in any manner necessary to make it compatible with the system of the controller 18.

The controller receives three separate types of information. The first type of information is a signal from set point or a nominal control signal. Secondly, it receives the octane error information from the octane comparator, via the signal conditioning system, which information is used to automatically control octane quality with respect to prototype standard. The third type of information is the signal from the totalizer 23 indicating the total amount of off-standard gasoline made to that point in the run. Upon receiving this infromation from the totalizer 23, the controller 18 immediately begins to work off this error by taking corrective action in the in-line blender. To avoid a total upset in the system, the corrective action which is taken by the controller due to the delta octane barrel indicator is limited to, for example, two-tenths of an octane number. For purposes of illustration, assume that the octane barrel indicator has accumulated one hundred octane barrels of error below specification. Since the maximum corrective action, due to the delta octane-barrel error, is limited to two-tenths of an octane number, the controller would adjust blending conditions to produce five hundred barrels of fuel at two-tenths octane number above standard. Upon initiation of delta octane barrel corrective action, the controller would adjust the set point to control quality at a level two-tenths above specification. Thus, as this change in the octane quality of line fuel is recognized by the comparator and the appropriate signal transmitted to the controller, the controller is prepared for such information and accordingly takes no corrective action in response to the signal from the comparator. However, the signal from the comparator is recorded on the strip chart recorder 16 to give a complete description of the octane quality of the fuel made throughout the blending run. Thus, assuming constant flow of hydrocarbon flow in line 13, and provided the controller automatically controlled the quality over the entire blend, the recorded analysis of the blend on the strip chart recorder should show an equal area above and below the line representing prototype fuel. When the contents of the delta octane barrel indicator return to zero, the control system returns octane quality to specification.

Another useful advantage of the automatic control obtainable with the octane comparator and the cumulative delta octane barrel indicator is the ability to mix different blending runs and still obtain a desired final octane quality. For example, the situation often arises where an amount of gasoline at the end of a run (assume 10,000 barrels) is pumped to a 50,000 barrel storage tank. The octane number of the fuel in the tank is tested and found to be 96. Suppose it is desired to fill the tank so that the final octane number of the fuel in the tank is 98. This is easily accomplished according to the present invention by simply setting the totalizer to indicate a minus 20,000 octane-barrel error. This error, together with any error occurring during blending will be worked out during the blending run so that the tank will be filled with 50,000 barrels of 98 octane number fuel.

Although the preferred embodiment of the present invention is to control total octane quality during a refinery in-line blending run, it should be understood that the present invention is not to be limited to this specific use. Other uses for the delta octane barrel indicator, such as a useful laboratory instrument in making octane studies, will readily suggest themselves to one skilled in the art.

It is to be understood that the preceding discussion is representative and that the specific embodiments exemplified may be varied within the scope of the total specification, as understood by one skilled in the art, to produce essentially the same results.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property of privilege is claimed are defined as follows:

1. In a process for producing a gasoline blend to a specification octane quality the improvement which comprises continuously providing a measurement of the octane quality difference, and the direction of the difference, between the blend and the specification by:
   (a) withdrawing a sample of the blended gasoline and passing said sample through a means for determining the difference in octane quality between two gasolines of known and unknown octane quality and producing a signal proportional to the difference in octane quality between the blend sample and the specification;
   (b) simultaneously passing the blended gasoline through a means for determining flow rate and producing a signal proportional to flow rate;
   (c) passing each of the signals from (a) and (b) to a multiplying means to produce a signal which is a function of both octane quality difference and flow rate, and then to an integrating means wherein the signal is integrated with respect to time to produce a signal which corresponds to an octane quality difference per volume unit;
   (d) repeating steps (a) to (c) and accumulating said integrated signals as to magnitude and direction to obtain a measurement of the octane quality difference, and the direction of the difference, between the blend and the specification.

2. The process of claim 1 wherein the blend is produced to specification by passing the accumulated integrated signals through a signal conditioning system to a controlling means which adjusts the blending conditions to dissipate the octane quality differences which have been accumulated during the process.

3. An apparatus for use in producing a gasoline blend to a specification octane quality, which apparatus continuously provides a signal which is a measurement of the octane quality difference, and the direction of the difference, between the blend and the specification and comprises:
   (a) a means for determining the difference in octane quality between two gasolines of known and unknown octane quality and producing a signal proportional to said difference;

(b) a means for determining the flow rate of the gasoline from the blender and producing a signal proportional to the flow rate;
(c) a means for multiplying the signals produced by (a) and (b) and producing a signal which is a function of octane quality difference and flow rate;
(d) a means for integrating the signal produced by (c) with respect to time and producing a signal which corresponds to an octane quality difference per volume unit; and
(e) a means for accumulating, in magnitude and direction, a sequence of signals produced by (d) and producing a signal which represents a measurement of the octane quality difference, and the direction of the difference, between the blend and the specification.

4. The apparatus of claim 3 which comprises, in addition, a means which utilizes the signal produced by (e) to control the blending conditions so as to dissipate the octane quality difference between the blend and the specification.

References Cited

UNITED STATES PATENTS

| | | | |
|---|---|---|---|
| 3,238,765 | 3/1966 | Beal | 73—35 |
| 3,312,102 | 4/1967 | Traver | 73—35 |

OTHER REFERENCES

Butler, "Automatic Blending Lives Up to Goal," Petroleum Refiner, vol. 39, No. 8, August 1960, pp. 97–100.

Sisk, "Automation for Gas Blending," Oil and Gas Journal, June 20, 1960, vol. 58, No. 25, pp. 108–111.

PATRICK P. CARVIN, *Primary Examiner.*

U.S. Cl. X.R.

73—35; 137—88, 93